(12) United States Patent
Cooper

(10) Patent No.: US 12,115,415 B1
(45) Date of Patent: Oct. 15, 2024

(54) METHODS AND SYSTEMS FOR FACILITATING PLAYING A GAME BASED ON RFID

(71) Applicant: Charles Cooper, San Pedro, CA (US)

(72) Inventor: Charles Cooper, San Pedro, CA (US)

( * ) Notice: Subject to any disclaimer, the term of this patent is extended or adjusted under 35 U.S.C. 154(b) by 0 days.

(21) Appl. No.: 18/433,882

(22) Filed: Feb. 6, 2024

(51) Int. Cl.
  *A63B 5/10* (2006.01)
  *A63B 24/00* (2006.01)
  *H04L 67/306* (2022.01)

(52) U.S. Cl.
  CPC ........ *A63B 24/0021* (2013.01); *H04L 67/306* (2013.01); *A63B 2024/0028* (2013.01); *A63B 2243/0025* (2013.01)

(58) Field of Classification Search
  CPC ........ A63B 24/0021; A63B 2024/0028; A63B 2243/0025; H04L 67/306
  USPC ....................................................... 473/471
  See application file for complete search history.

(56) References Cited

U.S. PATENT DOCUMENTS

| | | | |
|---|---|---|---|
| 10,493,329 B1* | 12/2019 | Luciano, Jr. | A63B 37/0003 |
| 2013/0130843 A1* | 5/2013 | Burroughs | G01S 13/751 |
| | | | 473/415 |
| 2019/0134506 A1* | 5/2019 | Gupta | G09B 19/0038 |
| 2020/0398111 A1* | 12/2020 | Near | G06K 7/10297 |
| 2021/0060391 A1* | 3/2021 | Legg | A63B 24/0021 |
| 2022/0350978 A1* | 11/2022 | Cooper | G06K 7/10366 |

\* cited by examiner

*Primary Examiner* — Alan S Chou
(74) *Attorney, Agent, or Firm* — Maier & Maier, PLLC

(57) ABSTRACT

Systems and methods for facilitating playing soccer based on RFID are provided. Accordingly, the method may include selecting one or more game rules. The method may further include communicatively coupling at least one ball with at least one communication device via an RFID sensor disposed on the at least one ball, the communication device further associated with a user. The method may further include generating ball tracking data from the at least one ball and receiving target data from at least one target sensor disposed on at least one target. The method may further include processing the ball tracking data and the target data in order to determine at least a score based on the one or more game rules.

15 Claims, 8 Drawing Sheets

METHODS AND SYSTEMS FOR FACILITATING PLAYING A GAME BASED ON RFID

BACKGROUND

The field of games, toys and sports goods is technologically important to several industries, business organizations, and/or individuals. Radio-frequency identification (RFID) is a method for the identification and tracking of assets without the need for line-of-sight between the reader and the tag. An RFID tag may include a radio receiver and transmitter that enables it to respond to an interrogation signal (radio waves) emitted by RFID readers. Further, passive RFID tags may be powered by the interrogation signal itself and do not require an external power source. The frequency range for radio waves is further categorized into low, high, and ultra-high frequency (UHF) ranges.

Due to its out-of-sight capabilities, RFID has been a literal game-changer. RFID technology has been applied to nearly every sport such as golf, soccer, etc. that involves the motion of the ball. Further, RFID has been successfully employed to monitor sports equipment. Therefore, there is a need for improved methods and systems for facilitating playing soccer based on RFID that may overcome one or more of the above-mentioned problems and/or limitations.

SUMMARY

According to some embodiments, a method for facilitating playing soccer based on RFID is disclosed. Accordingly, the method may include selecting one or more game rules. The method may further include communicatively coupling at least one ball with at least one communication device via an RFID sensor disposed on the at least one ball, the communication device further associated with a user. The method may further include generating ball tracking data from the at least one ball and receiving target data from at least one target sensor disposed on at least one target. The method may further include processing the ball tracking data and the target data in order to determine at least a score based on the one or more game rules.

According to some embodiments, a system for facilitating playing soccer based on RFID is disclosed. According to some aspects, the system for facilitating playing soccer based on RFID is disclosed. Accordingly, the system may include a communication device configured for receiving a request from at least one user device associated with at least one user. Further, the communication device may be configured for transmitting a radio tracking indication to a Radio Frequency Identification (RFID) reader (or writer). Further, the communication device may be configured for receiving target data from at least one target sensor disposed on at least one target. Further, the communication device may be configured for transmitting the user performance to the at least one user device. Further, the system may include a processing device configured for generating the radio tracking indication based on the receiving of the request. Further, the processing device may be configured for processing the ball tracking data and the target data based on game data. Further, the processing device may be configured for generating the user performance based on the processing. Further, the system may include an RFID antenna configured for emitting interrogating radio waves based on the transmitting of the radio tracking indication. Further, the RFID antenna may be configured for receiving returned radio waves from at least one RFID tag disposed on the at least one ball. Further, the system may include the RFID reader configured for generating ball tracking data based on the returned radio wave. Further, the system may include a storage device configured for retrieving the game data corresponding to the game type indication. Further, the game data may include rules and scoring criteria of the game type. Further, the storage device may be configured for storing at least one of the request, the sensor data, the target sensor data, and the user performance.

BRIEF DESCRIPTION OF THE FIGURES

Advantages of embodiments of the present invention will be apparent from the following detailed description of the exemplary embodiments. The following detailed description should be considered in conjunction with the accompanying figures in which.

DETAILED DESCRIPTION

Figure 1:
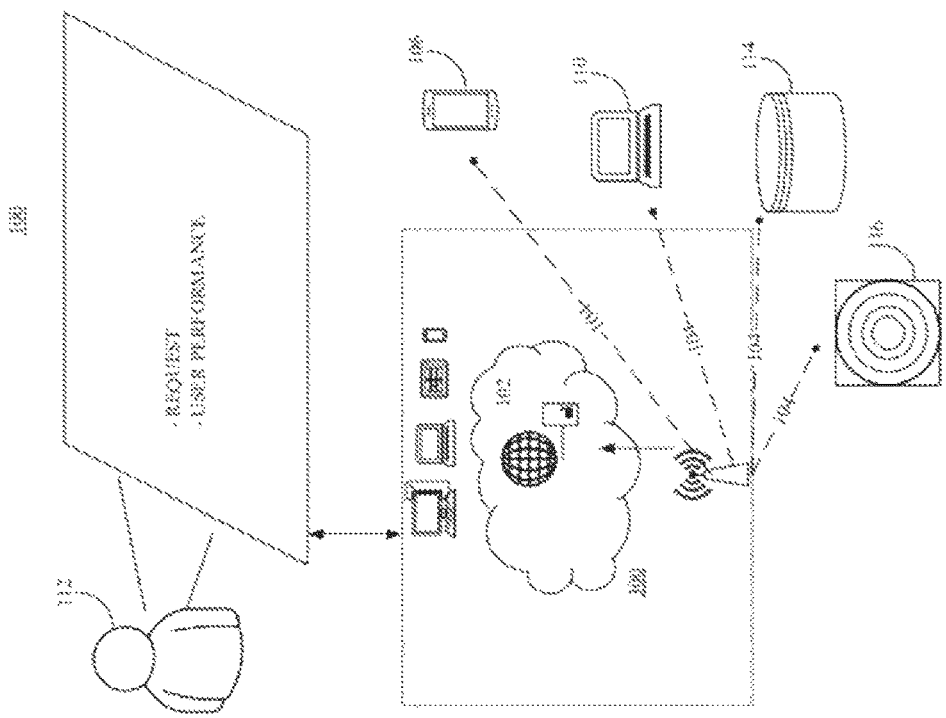
FIG. 1 is an illustration of an online platform consistent with various embodiments of the present disclosure.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

In one or more exemplary embodiments methods and systems for facilitating playing a game based on RFID may be shown and described. In an embodiment the ball game may be, for example, using a soccer ball. In other embodiments other balls or tools may be used, e.g. football, basketball, golf ball, hockey puck, etc. In some embodiments a user (or player) may kick a soccer ball or any ball that can be kicked through targets on a field that uses RFID (Radio Frequency Identification) so the player gets points and can track their scores based on the distance the user kicks the ball and which target the user kicks it in using RFID technology in the balls and each target. Further, each of the targets may include one or more sensors.

The sensors may include, for example, motion sensors, temperature sensors, humidity sensors, cameras such as an RGB-D Camera which is a digital camera providing color (RGB) and depth information for every pixel in an image, microphones, radiofrequency receiver, a thermal imager, a radar device, a lidar device, an ultrasound device, a speaker, wearable devices etc. Also, the plurality of sensors 108 may include tracking devices, such as RFID tags, GPS chips or other such devices embedded on uniforms, in equipment, in the field of play, in the boundaries of the field of play, or other markers on the field of play. Imaging devices may also be used as tracking devices such as player tracking that provides statistical information through real-time X, Y positioning of players and X, Y, Z positioning of the ball.

In exemplary embodiments antennas and RFID sensors in the field, targets, ball, and or players may determine a player score based on one or more rulesets. In one embodiment the one or more rulesets may be for a distance-based soccer game. For example, there may be a plurality of targets at different distances (e.g. 10 meters, 20 meters, 30 meters, etc.). Players may obtain points by kicking a soccer ball through or at the targets at different distances, and different point values may be awarded according to which target is hit. For example, in an embodiment each target may be worth a predetermined number of points, such as points equal to the distance of the target. In other embodiments games may include, for example, scoring points for making every target within a larger target or goal, longest target hit, games where different targets have different point values and players compete to reach a specific value, games like H.O.R.S.E. and/or games where farther targets give higher points.

In another embodiment the one or more rulesets may be for a target-based soccer game. For example, each of the targets may further be have a series of smaller targets on them. In one embodiment the series of smaller targets may be a series of overlapping concentric ring targets that get smaller towards the center of the target. In another embodiment there may be multiple smaller targets of varying sizes spread across the larger target. The targets may be hollow areas that allow passage of a soccer ball through the larger target, or may be specified surface areas on the larger target. In an exemplary embodiment points may be awarded based on which of the smaller targets is hit, and the number of points awarded may be dependent on the size of the target, e.g. were a smaller target is worth more points. In some embodiments multiple rulesets may be combined, for example there may be a target-based soccer game were the value of the targets are multiplied based on the distance from the player. In some embodiments moving targets may be utilized, for example a truck or other vehicle may be equipped with one or more sensors and/or the targets may have one or more means of movement, for example a motor that allows the target to move along a track. In another embodiment a pop-up event may be hosted, for example by using movable or collapsible goals and an existing facility, e.g. a baseball stadium.

Referring now to figures, FIG. 1 is an illustration of an online platform 100 for performing ball games based on RFID may be shown and described. The games may be, for example, soccer and/or football based. The online platform 100 for facilitating playing games based on RFID may be hosted on, for example, a centralized server 102, such as, for example, a cloud computing service. In other embodiments the online platform may be part of a wired and/or wireless network.

The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, and other communication techniques, as desired. The communication network may allow ubiquitous access to shared pools of configurable system resources and higher-level services that can be rapidly provisioned with minimal management effort, often over internet and relies on sharing of resources to achieve coherence and economies of scale, like a public utility, while third-party clouds enable organizations to focus on their core businesses instead of expending resources on computer infrastructure and maintenance.

The centralized server 102 may communicate with one or more other network entities, such as, for example, a mobile device 106 (such as a smartphone, a laptop, a tablet computer, etc.), other electronic devices 110 (such as desktop computers, server computers, kiosks, etc.), databases 114, and sensors 116, over a communication network 104, such as, but not limited to, the Internet, Wi-fi, wireless short range communication, near field communication (NFC) etc. Further, the online platform 100 may have a plurality of third party users including, but not limited to, end-users, service providers, and administrators. Accordingly, in some instances, electronic devices operated by the one or more third party users may be in communication with the online platform 100.

In some embodiments the electronic devices 110 may be screens set up at a kicking bay or other area. The user may be able to see their or other players scores utilizing either the electronic devices 110 and/or mobile device 106. A user 112, which may in some embodiments include the one or more third party users, may access the online platform 100 through a software application, phone app, browser, etc. The software application may be, for example, but not be limited to, a website, a web application, a desktop application, and a mobile application compatible with a computing device 300. The software application may track and store user data, such as the users play history, records, and activities logs, etc. The software application may be tied to the user through, for example, a username, email, phone number, etc.

Figure 2:
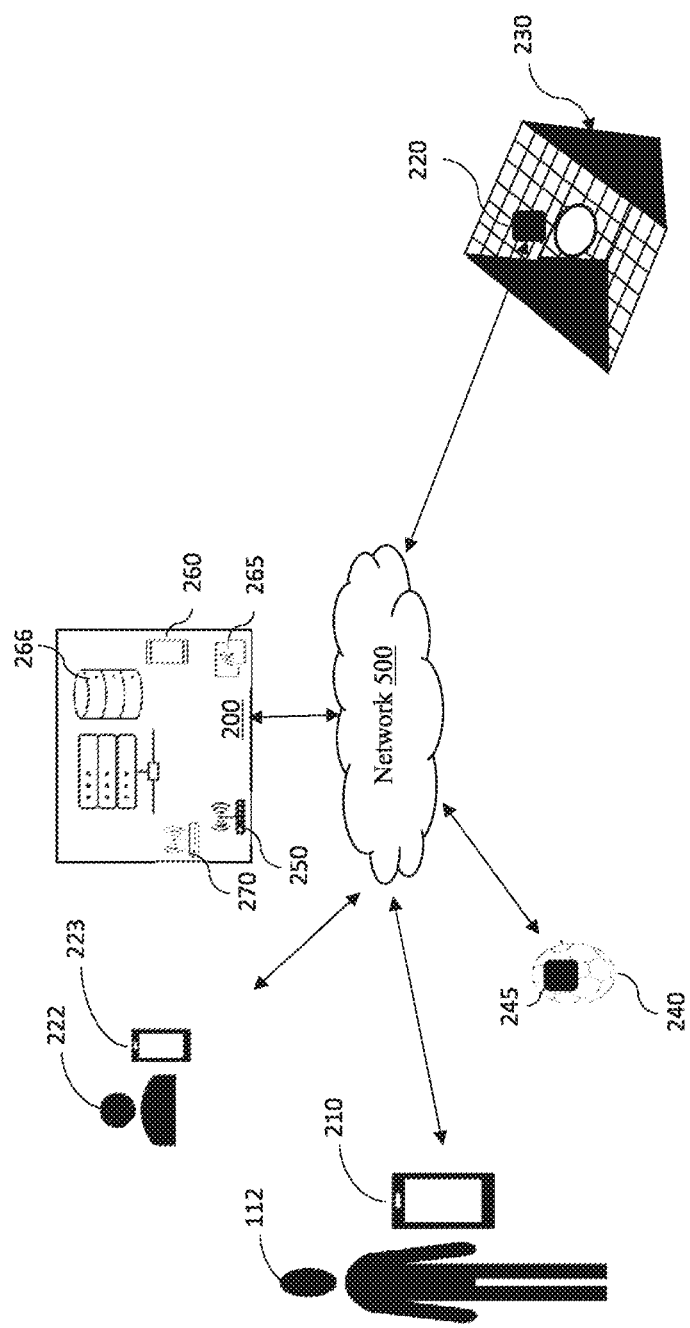
FIG. 2 illustrates a system in a network environment with a target, in accordance with some embodiments.

Referring to FIG. 2, a system for facilitating playing soccer based on RFID 200 may be shown and described. The system 200 may include a communication device 250 configured for receiving a request from at least one user device 210 associated with at least one user. Further, the request may include one or more identifying information of the at least one user 112 that may want to play soccer. For example, the identifying information may include a name, age, gender, past play history, etc. The at least one user 112 may be an individual or may be a party or group of individuals. The at least one user device 210 may include a smartphone, a mobile, a tablet, a personal laptop, a laptop, and so on. Further, the request may include a game type indication corresponding to a game type of soccer that the at least one user 112 may want to play. For example, the game type indication may be for distance-based soccer, target-based soccer game, etc. The communication device 250 may further be configured for transmitting a radio tracking indication to a Radio Frequency Identification (RFID) reader and/or writer.

The system 200 may include an RFID antenna configured for emitting interrogating radio waves based on the transmitting of the radio tracking indication. The RFID antenna 270 may be communicatively coupled to an RFID reader 265. The RFID antenna 270 may be configured for receiving returned radio waves from at least one RFID tag 245, which may be disposed on the at least one ball 240. The at least one RFID tag 245 may include at least one sensor configured for detecting ball parameters associated with the at least one ball 240. The at least one sensor may include, for example but not limited to, at least one of a location sensor, an orientation sensor, a force sensor, a multiaxis accelerometer, an altitude sensor, and so on. Further, the at least one sensor may be configured for generating sensor data. In some embodiments video and/or audio detection may also be used, for example through video, camera, or microphone feed.

The system 200 may include the RFID reader 265 configured for generating ball tracking data based on the returned radio wave. The RFID reader 265 may be communicatively coupled to the processing device 260. Further, the ball tracking data may include the sensor data. The processing device 260 may determine, based on the sensor data, tracking data for the ball, for example the trajectory, velocity, speed, range, etc. of the ball.

The system 200 may include a storage device 266 configured for retrieving the game data corresponding to the game type indication. The game data may include rules and scoring criteria of the game type. The game data may further contain additional data about such as the type of ball to be used, the field, number and position of targets, etc. Further, the storage device 266 may be configured for storing at least one of the request, the sensor data, the target sensor data, and the user performance.

Figure 3:
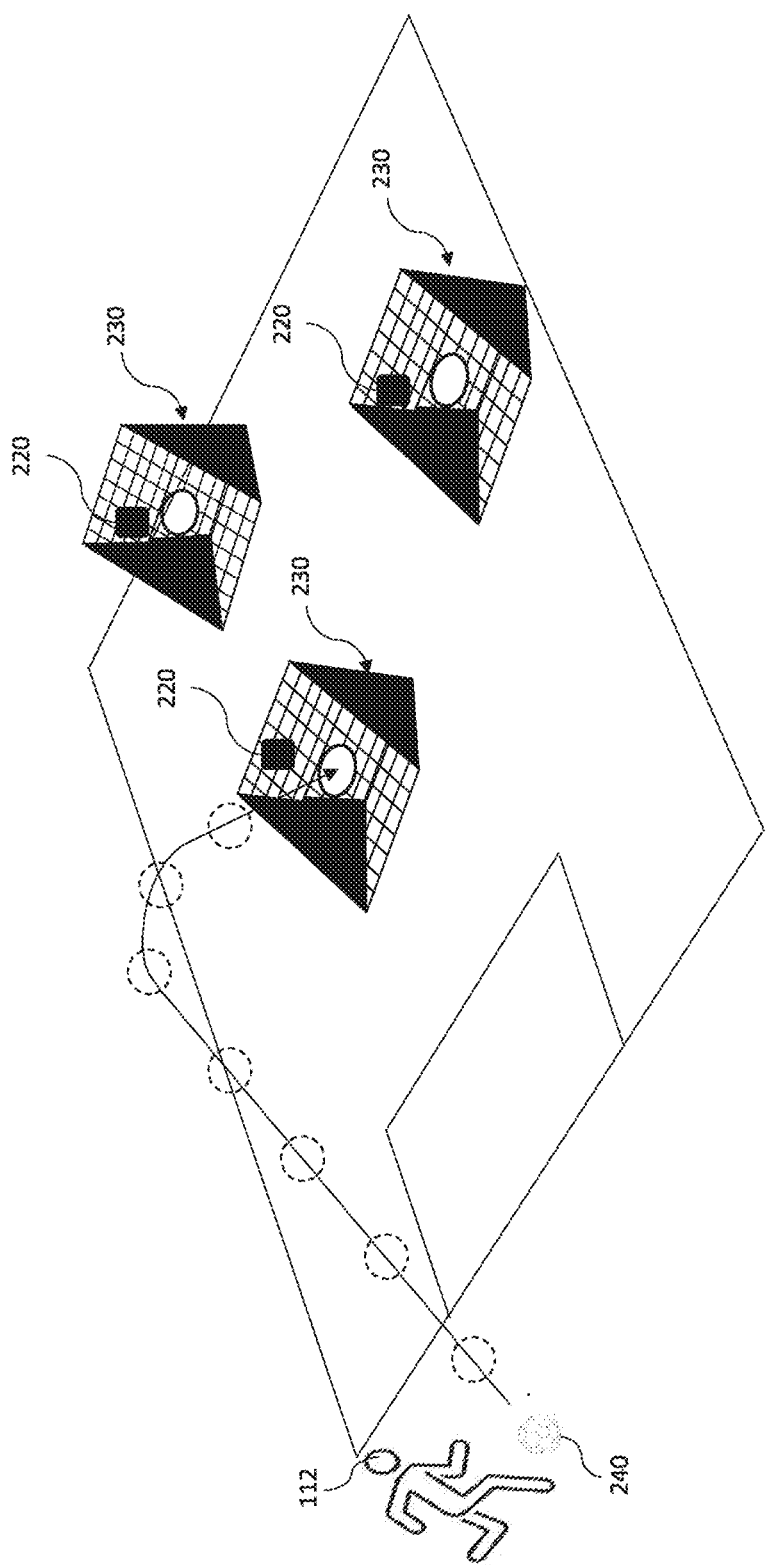
FIG. 3 illustrates a soccer field with multiple targets, in accordance with some embodiments.

Referring to FIG. 3, an exemplary play field with targets 230 may be shown and described. In some embodiments the targets may be, for example, a soccer goal. The communication device 250 may be configured for receiving target data from at least one target sensor 220 disposed on at least one target 230. The at least one target 230 may be located throughout a game field, which may be, for example, an arena, soccer field, park field, etc. The at least one target sensor 220 may be configured for detecting the presence of the at least one ball 240 in the at least one target 230. The at least one target sensor 220 may include, for example but not limited to, a piezoelectric pressure sensor, a capacitive pressure sensor, an accelerometer, etc. In some embodiments the at least one target sensor may additionally work in conjunction with, for example, video or audio feed. Further, the communication device 250 may be configured to transmit the user performance to the at least one user device 210. Further, the system 200 may include a processing device 260 configured to generate the radio tracking indication based on the receiving of the request. Further, the radio-tracking indication may correspond to the generation of radio waves for facilitating tracking of at least one ball 240 that may be kicked by the at least one user 112 for playing soccer. In some embodiments the at least one ball 240 may include a football, an inflatable ball, a golf ball, a volleyball, etc. Further, the processing device 260 may be configured for processing the ball tracking data and the target data based on game data. Further, the processing device 260 may be configured for generating the user performance based on the processing. The user performance may include a score corresponding to the at least one user 112. In some embodiments the user performance may include additional performance parameters, for example but not limited to, speed, accuracy, force, motion trajectory of the at least one ball, etc.

In some embodiments the users previous performance and parameters may also be taken into consideration when determining user performance, for example showing an increase or decrease in some or all aspects of the user performance.

Figure 5:
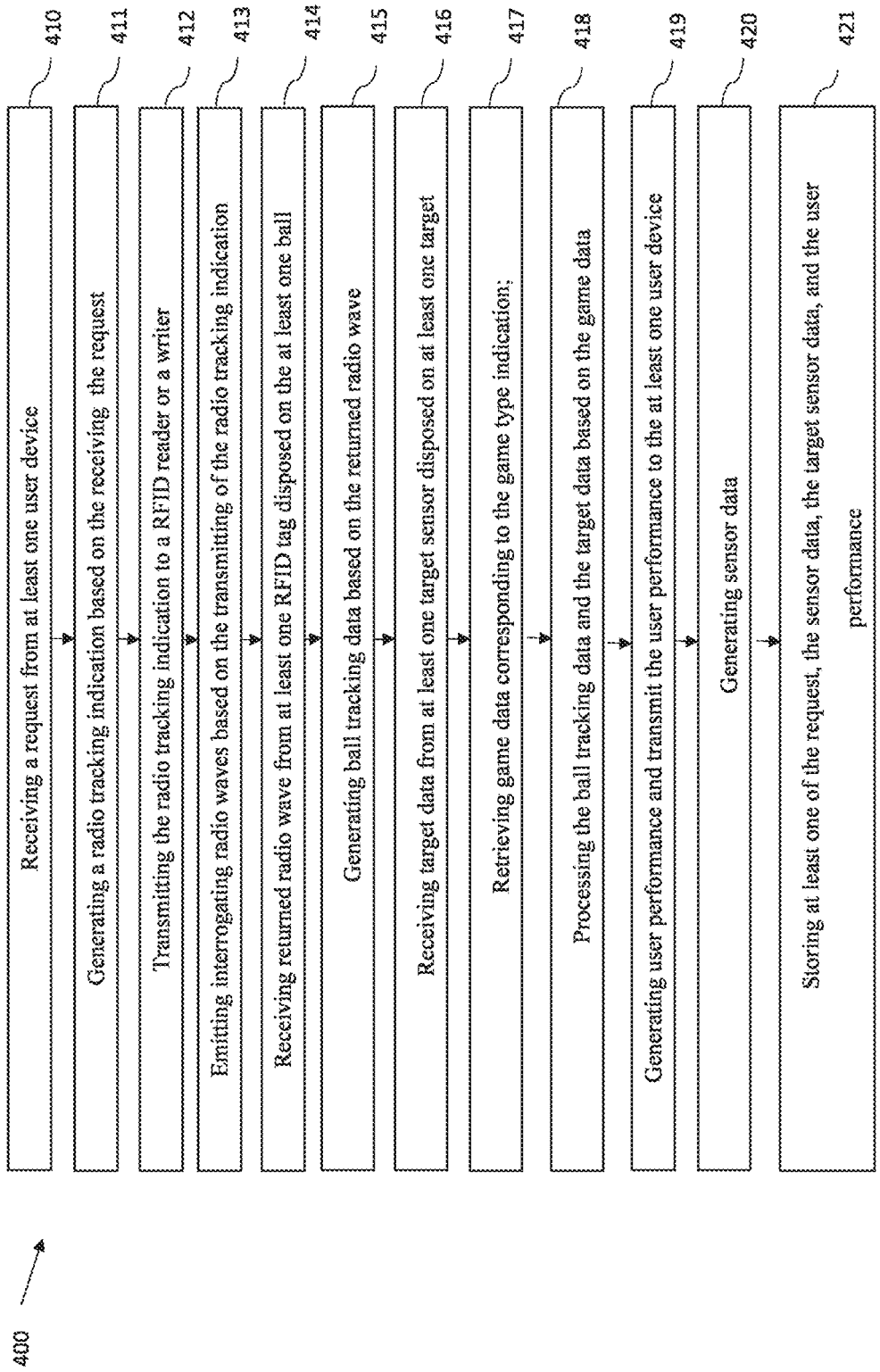
FIG. 5 is a simplified flow diagram illustrating an example operation of the present invention.

Referring to FIG. 5, a simplified flow diagram illustrating exemplary processes of an operation 400 may be shown and described.

In a first step 410, the method may include a process for receiving a request from at least one user device 210. In a next step 411, the method may include a process for generating a radio tracking indication based on the receiving request. In a next step 412, the method may include a process for transmitting the radio tracking indication to a RFID reader or a writer 265. In a next step 413, the method may include a process for emitting interrogating radio waves based on the transmitting of the radio tracking indication. In a next step 414, the method may include a process for receiving returned radio wave from at least one RFID tag 245 disposed on the at least one ball 240. In a next step 415, the method may include a process for generating ball tracking data based on the returned radio wave. In a next step 416, the method may include a process for receiving target data from at least one target sensor 220 disposed on at least one target 230.

In a next step 417, the method may include a process for retrieving game data corresponding to the game type indication. In a next step 418, the method may include a process for processing the ball tracking data and the target data based on the game data. In a next step 419, the method may include a process for generating user performance and transmit the user performance to the at least one user device 210. In a next step 420, the method may include a process for generating sensor data. In a next step 421, the method may include a process for storing at least one of the request, the sensor data, the target sensor data, and the user performance.

Accordingly, the method may include receiving, using a communication device 250, a request from at least one user device 210 associated with at least one user 112. Further, the request may include an indication of the at least one user 112 that may want to play soccer. Further, the at least one user 112 may include an individual. Further, the at least one user device 210 may include a smartphone, a mobile, a tablet, a personal laptop, a laptop, and so on. Further, the request may include a game type indication corresponding to a game type of soccer that the at least one user may want to play. Further, the game type indication may be associated with distance-based soccer, target-based soccer game, etc. Further, the game type may include the at least one user hitting each target of the at least one target on the soccer field.

Further, the method may include generating, using a processing device 260, a radio tracking indication based on the receiving of the request. Further, the radio-tracking indication may correspond to the generation of radio wave for facilitating tracking of at least one ball 240 that may be kicked by the at least one user for playing soccer. Further, the at least one ball 240 may include a football, volleyball, basketball, inflatable ball, etc.

Further, the method may include transmitting, using the communication device 250, the radio tracking indication to a Radio Frequency Identification (RFID) reader (or writer) 265.

Further, the method may include emitting, using an RFID antenna 270, interrogating radio waves based on the transmitting of the radio tracking indication. Further, the RFID antenna 270 may be communicatively coupled to the RFID reader 265. Further, a frequency range for the interrogating radio waves may be categorized into low, high, and ultra-high frequency (UHF) ranges.

Further, the method may include receiving, using the RFID antenna 270, returned radio wave from at least one RFID tag 245 disposed on the at least one ball 240. Further, the at least one RFID tag 245 may include at least one sensor configured for detecting ball parameters associated with the at least one ball 240. Further, the at least one sensor may include at least one of a location sensor, an orientation sensor, a force sensor, a multiaxis accelerometer, an altitude sensor, and so on. Further, the at least one sensor may be configured for generating sensor data.

Further, the method may include generating, using the RFID reader 240, ball tracking data based on the returned radio wave. Further, the RFID reader 240 may be communicatively coupled to the processing device 260. Further, the ball tracking data may include the sensor data.

Further, the method may include receiving, using the communication device 250, target data from at least one target sensor 220 disposed on at least one target 230. Further, the at least one target 230 may be located throughout a field, for example a soccer field (as shown in FIG. 3). Further, the at least one target sensor may be configured for detecting the presence of the at least one ball 240 in the at least one target 230.

Further, the method may include retrieving, using a storage device 266, game data corresponding to the game type indication. Further, the game data may include rules and scoring criteria of the game type.

Further, the method may include processing, using the processing device 260, the ball tracking data and the target data based on the game data.

Further, the method may include generating, using the processing device 260, user performance based on the processing. Further, the user performance may include a score corresponding to the at least one user 112. Further, the user performance may include performance parameters that may include speed, accuracy, force, motion trajectory of the at least one ball 240 that may be kicked by the user 112.

Further, the method may include transmitting, using the communication device 250, the user performance to the at least one user device 210.

Further, the method may include storing, using the storage device 266, at least one of the request, the sensor data, the target sensor data, and the user performance.

Further, in some embodiments, the method may include retrieving, using the storage device 266, an artificial intelligence model. Further, the artificial learning model may include a machine learning model. Further, the processing may be based on the artificial learning model. Further, the method may include generating, using the processing device 260, a game suggestion based on the processing. Further, the game suggestion may include one or more advice suggestions for the at least one user 112. The advice may include, for example, a training plan on how to practice to improve specific aspects of performance, for example a training plan for increasing kicking distance, or a training plan to increase kicking accuracy. In other embodiments the advice may include specific critiques, for example on the user's kicking style, approach, etc. the specific critiques may be displayed on a device with visual diagrams or simulations to demonstrate the critique. In some embodiments the AI and ML may further utilize one or more external data sources, for example local weather data. Further, the method may include transmitting, using the communication device 250, the game suggestion to the at least one user device 210. Further, the method may include storing, using the storage device, the game suggestion.

Figure 4:
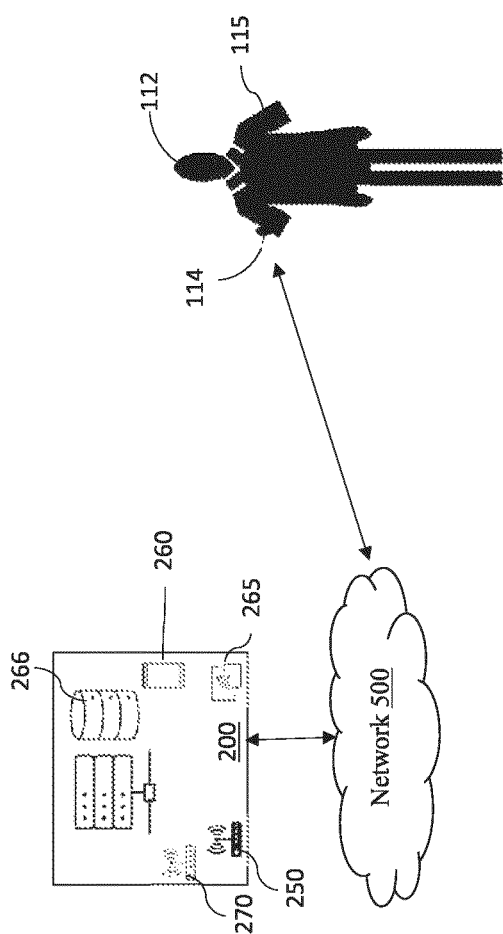
FIG. 4 illustrates an RFID sensor disposed on one apparel of one user, in accordance with some embodiments.

Further, in some embodiments, the method may include receiving, using the communication device 250, user identification data from an input device. Further, the input device may include an RFID sensor 114 that may be disposed on at least one apparel 115 of the at least one user 112, as shown in FIG. 4. Further, the at least one apparel 115 may include a shoelace, a shoe, at shirt, a trouser, etc. Further, the ball parameters may include ball identification data. Further, the ball identification data may facilitate identification of the ball 240. Further, the method may include analyzing, using the processing device 260, the user identification data and the ball identification data to generate an association indication. Further, the method may include associating, using the processing device 260, the user identification data to the ball identification data based on the association indication. Further, the association indication may facilitate registration of the at least one ball 240 with the at least one user 112. Each of the at least one ball 240 may have a unique RFID chip associated with the ball. In some embodiments the at least one user 112 may scan the unique RFID chip in order to register and associate the ball 240 with the at least one user 112. Further, the method may include transmitting, using the communication device 250, the association indication to the at least one user device 210. Further, the method may include storing, using the storage device 266, the association indication. Further, in some embodiments, the method may include receiving, using the communication device 250, user data from the at least one user device 210. Further, the user data may include a name, an address, an email id, etc. Further, the method may include analyzing, using the processing device 260, the user data to generate a user profile. Further, the user profile may include user credentials that may include a user name and a password. Further, the method may include transmitting, using the communication device 250, the user credentials to the at least one user device 210. Further, the user profile may include at least one of the association indication, the user performance, and the game suggestion. Further, the method may include storing, using the storage device 266, the user profile suggestion.

Further, in some embodiments, the method may include analyzing, using the processing device 260, at least one of the user performance and the game suggestion to generate a game insight. Further, the game insight may include a measure of performance of the gameplay of the at least one user over a predetermined period of time. Further, the game insight may facilitate tracking progress of the gameplay of the at least one user 112. In an exemplary embodiment the game insight may be, for example, showing on a screen a corrected way of kicking a ball to gain further distance, where the AI or ML determines that the player has difficulty reaching far targets. In another embodiment the game insight may notify the user on how weather or other conditions are effecting their play, for example notifying the user that due to hot temperatures the ball may travel farther than expected when kicked (due to the heat causing the ball to expand).

Further, in some embodiments, the method may include receiving, using the communication device 250, a service request from at least one second user device 223 associated with at least one second user 222. Further, the service request may be associated with at least one service that may include marketing, account management, product development, etc. Further, the at least one second user 222 may include a management authority responsible for allowing the gameplay in the soccer field. Further, the management authority may include an individual, an institution, and an organization that may want to receive the at least one service. Further, the at least one second user device 223 may include a smartphone, a mobile, a tablet, a personal laptop, a laptop, and so on. Further, the method may include retrieving, using the storage device 266, service resources associated with the service request. Further, the service resources may include instructional content for facilitating provisioning of the at least one service. Further, the method may include transmitting, using the communication device 250, the service resources to the at least one second user device 223.

Figure 6:
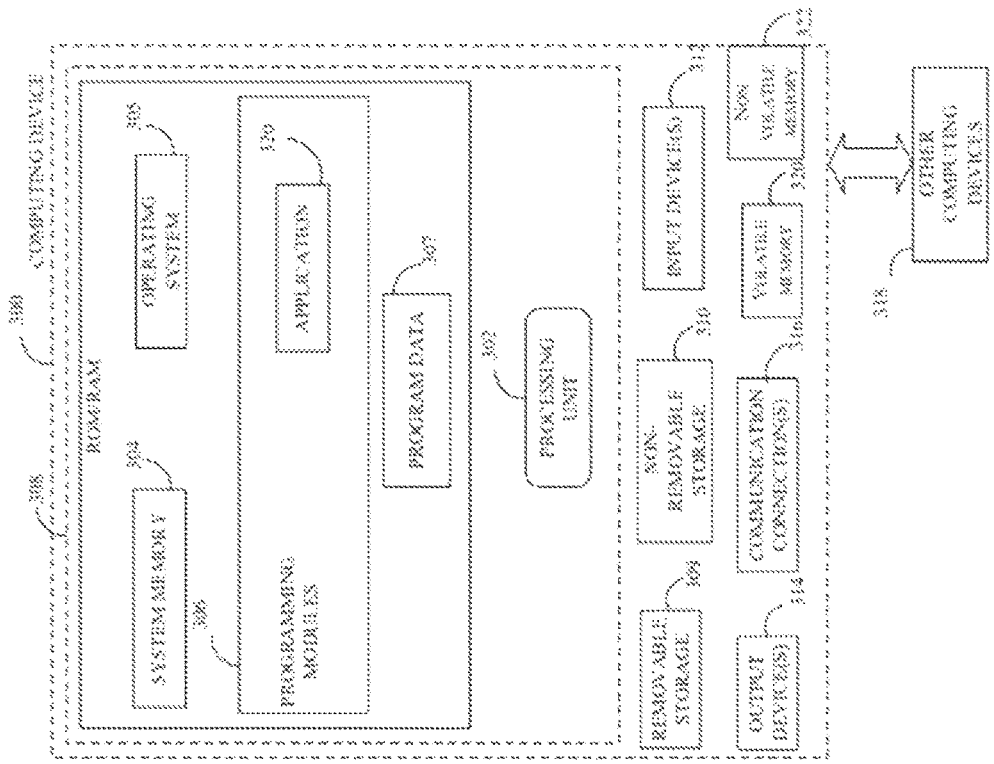
FIG. 6 is a block diagram of a computing device for implementing the methods disclosed herein, in accordance with some embodiments.

With reference to FIG. 6, a system 200 consistent with an embodiment of the disclosure may include a computing device or cloud service, such as computing device 300. In a basic configuration, computing device 300 may include at least one processing unit 302 and a system memory 304. Depending on the configuration and type of computing device, system memory 304 may comprise, but is not limited to, volatile (e.g. random-access memory (RAM)), non-volatile (e.g. read-only memory (ROM)), flash memory, or any combination. System memory 304 may include operating system 305, one or more programming modules 306, and may include a program data 307. Operating system 305, for example, may be suitable for controlling computing device 300's operation. In one embodiment, programming modules 306 may include image-processing module, machine learning module and/or image classifying module. Furthermore, embodiments of the disclosure may be practiced in conjunction with a graphics library, other operating systems, or any other application program and is not limited to any particular application or system. This basic configuration is illustrated in FIG. 6 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 6 by a removable storage 309 and a non-removable storage 310. Computer storage media may include volatile and nonvolatile, removable, and non-removable media implemented in any method or technology for storage of information, such as computer-readable instructions, data structures, program modules, or other data. System memory 304, removable storage 309, and non-removable storage 310 are all computer storage media examples (i.e., memory storage.) Computer storage media may include, but is not limited to, RAM, ROM, non-volatile storage 322, volatile storage 320 electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, a location sensor, a camera, a biometric sensor, etc. Output device(s) 314 such as a display, speakers, a printer, etc. may also be included. The aforementioned devices are examples and others may be used.

Computing device 300 may also contain a communication connection 316 that may allow device 300 to communicate with other computing devices 318, such as over a network 500 in a distributed computing environment, for example, an intranet or the Internet. Communication connection 316 is one example of communication media. Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both storage media and communication media.

As stated above, a number of program modules and data files may be stored in system memory 304, including operating system 305. While executing on processing unit 302, programming modules 306 (e.g., application 320 such as a media player) may perform processes including, for example, one or more stages of methods, algorithms, systems, applications, servers, databases as described above. The aforementioned process is an example, and processing unit 302 may perform other processes. Other programming modules that may be used in accordance with embodiments of the present disclosure may include sound encoding/decoding applications, machine learning application, acoustic classifiers, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Figure 7:
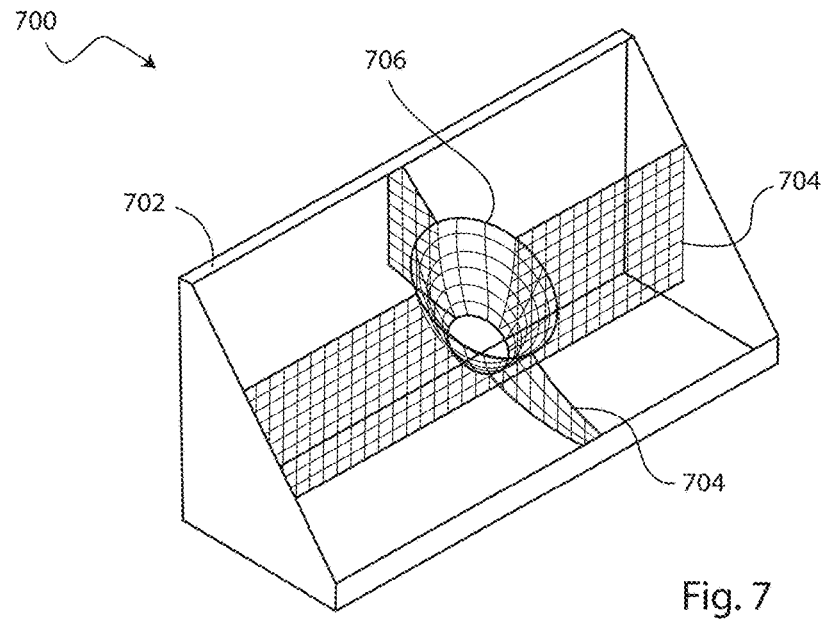
FIG. 7 is an exemplary target.

Referring to FIG. 7, an exemplary target 700 may be shown and described. The target may have an outer bounds 702, which may be, for example, and upside down soccer goal. In other embodiments the outer bounds 702 may be formed from a different structure, for example but not limited to, a truck bed, American football posts, etc. The outer bounds may have inner divides 704 which may be, for example, netting and an inner goal 706. The inner divides may split the target 700 into two or more subdivided sections, for example by creating inner quadrants. In some embodiments multiple sensors may be attached to each of one or more parts of the target, for example there may be one or more sensors in each quadrant and/or the inner target area.

Figure 8:
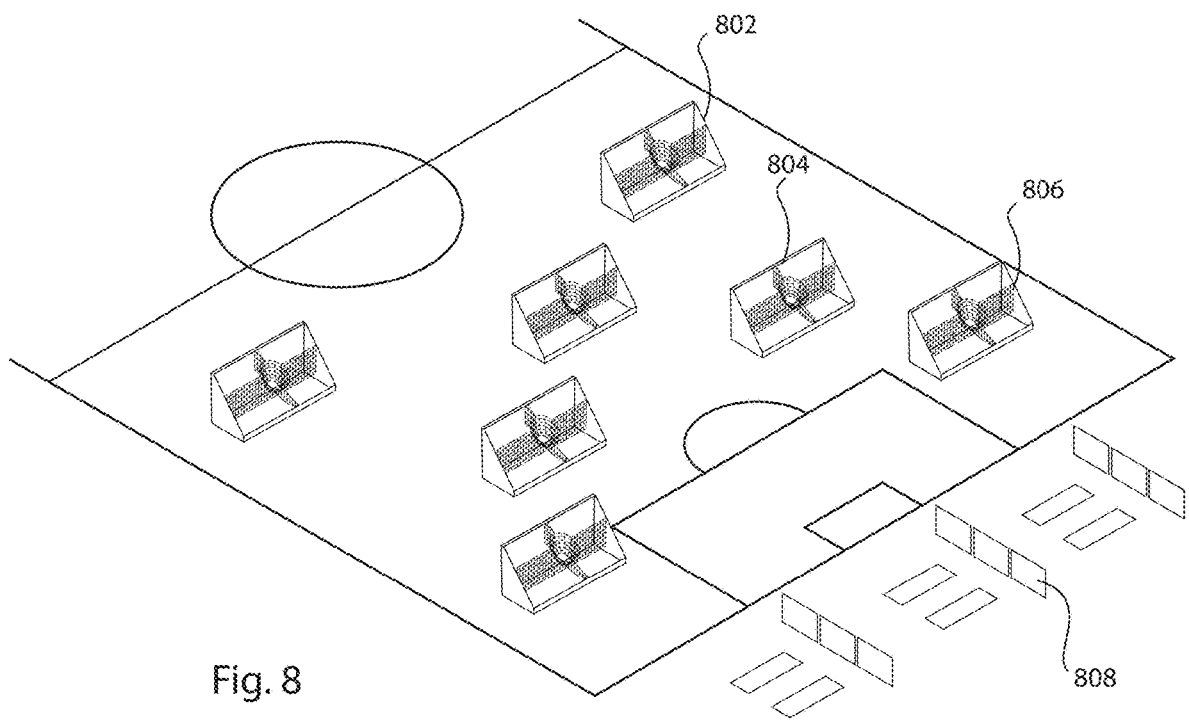
FIG. 8 is an exemplary playing field with a plurality of exemplary target.

Referring to FIG. 8, an exemplary playing field 800 may be shown and described. The playing field 800 may have a plurality of targets 802, 804, 806. In some embodiments different targets or sets of targets may be colored differently, for example targets 802 may be red, targets 804 may be yellow, and targets 806 may be green. The different colors may correspond to, for example, different point values or different distances. The playing field 800 may further have a plurality of kicking stations 808.

Figure 9:
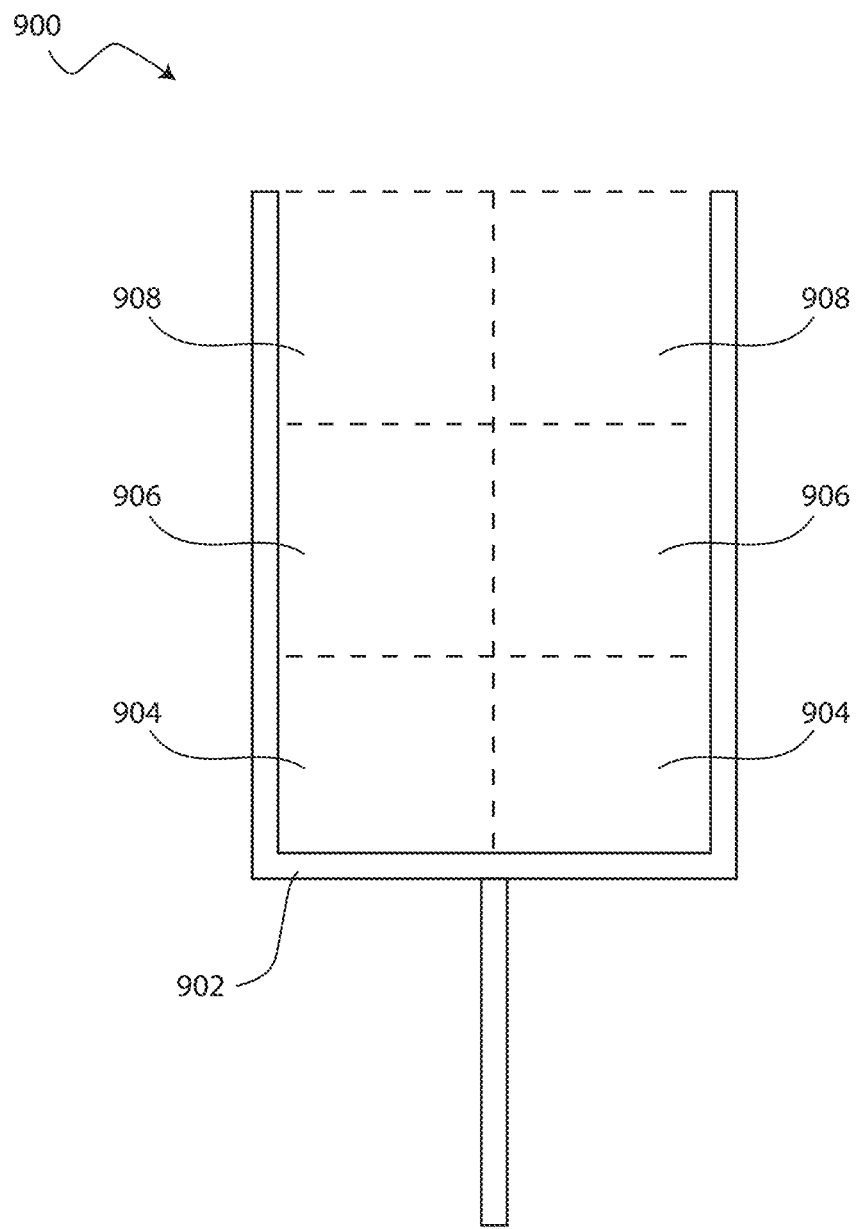
FIG. 9 is an exemplary goalpost target.

Referring to FIG. 9, an exemplary goalpost target 900 may be shown and described. The goalpost target 900 may have an outer bounds 902 which may be, for example, a football goalpost or custom design goalpost. The goalpost target 900 may further have one or more sensors which may sense a ball passing through a plurality of zones. The plurality of zones may include, for example, lower zones 904, middle zones 906, and upper zones 908.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for facilitating a game based on RFID, comprising:
   selecting one or more game rules;
   communicatively coupling at least one ball with at least one communication device via an RFID sensor disposed on the at least one ball, the communication device further associated with a user;
   generating ball tracking data from the at least one ball;
   receiving target data from at least one target sensor disposed on at least one target;
   processing the ball tracking data and the target data in order to determine at least a score based on the one or more game rules;
   utilizing the ball tracking data and the target data to generate at least one user critique or game suggestion for the user; and
   transmitting, using the at least one communication device, the at least one user critique or game suggestion to the user;
   wherein the at least one user critique or suggestion further utilizes at least one external data source.

2. The method for facilitating the game based on RFID of claim 1, wherein the at least one user critique or game suggestion is generated using artificial intelligence and/or machine learning.

3. The method for facilitating the game based on RFID of claim 1, wherein the at least one external data source includes at least local weather data.

4. The method for facilitating the game based on RFID of claim 1, further comprising displaying the at least one user critique or game suggestion on the at least one communication device by simulating a advised play based on the at least one user critique or game suggestion.

5. The method for facilitating the game based on RFID of claim 1, wherein the one or more game rules include at least one of, a distance-based game, an accuracy based game, and/or a target based game.

6. The method for facilitating the game based on RFID of claim 1, further comprising associating a user profile for each of the at least one user, wherein the user profile includes at least user performance and the at least one user critique or game suggestion.

7. The method for facilitating the game based on RFID of claim 6, wherein the user performance includes at least speed, accuracy, force, and motion trajectory of the at least one ball.

8. A system for facilitating a game based on RFID, comprising:
   At least one communication device associated with a user, the at least one communication device configured to select one or more game rules;
   at least one ball disposed with an RFID sensor, the RFID sensor communicatively coupled to the communication device;
   at least one target disposed with at least one sensor, the at least one sensor configured to detect the presence of the at least one ball;
   a tracking module configured to generate ball tracking data from the at least one ball; and
   a processing module configured to process the ball tracking data and the target data in order to determine at least a score based on the one or more game rules and utilize the ball tracking data and the target data to generate at least one user critique or game suggestion for the user;
   wherein the at least one user critique or game suggestion is transmitted to the at least one communication device; and
   the at least one user critique or suggestion further utilizes at least one external data source.

9. The system for facilitating the game based on RFID of claim 8, wherein the at least one user critique or game suggestion is generated using artificial intelligence and/or machine learning.

10. The system for facilitating the game based on RFID of claim 8, wherein the at least one external data source includes at least local weather data.

11. The system for facilitating the game based on RFID of claim 8, further comprising a simulation module that simulates an advised play based on the at least one user critique or game suggestion.

12. The system for facilitating the game based on RFID of claim 8, wherein the one or more game rules include at least one of, a distance-based game, an accuracy based game, and/or a target based game.

13. The system for facilitating the game based on RFID of claim 8, further comprising a user databased which associates a user profile with each of the at least one users, wherein the user profile includes at least user performance and the at least one user critique or game suggestion.

14. The system for facilitating the game based on RFID of claim 13, wherein the user performance includes at least speed, accuracy, force, and motion trajectory of the at least one ball.

15. A non-transitory readable medium containing computer-readable instructions stored therein for executing a method comprising:
   selecting one or more game rules;
   communicatively coupling at least one ball with at least one communication device via an RFID sensor disposed on the at least one ball, the communication device further associated with a user;
   generating ball tracking data from the at least one ball;
   receiving target data from at least one target sensor disposed on at least one target;
   processing the ball tracking data and the target data in order to determine at least a score based on the one or more game rules;
   utilizing the ball tracking data and the target data to generate at least one user critique or game suggestion for the user; and
   transmitting, using the at least one communication device, the at least one user critique or game suggestion to the user;

wherein the at least one user critique or suggestion further utilizes at least one external data source.

* * * * *